(12) United States Patent
Seo et al.

(10) Patent No.: US 11,538,359 B2
(45) Date of Patent: Dec. 27, 2022

(54) BRAILLE TEACHING MATERIAL AND METHOD OF MANUFACTURING SAME

(71) Applicant: SENSEE, INC., Daejeon (KR)

(72) Inventors: In Sik Seo, Daejeon (KR); Ji Yun Cho, Daejeon (KR)

( * ) Notice: Subject to any disclaimer, the term of this patent is extended or adjusted under 35 U.S.C. 154(b) by 197 days.

(21) Appl. No.: 17/061,953

(22) Filed: Oct. 2, 2020

(65) Prior Publication Data
US 2022/0044590 A1 Feb. 10, 2022

(30) Foreign Application Priority Data

Aug. 10, 2020 (KR) .................. 10-2020-0100057

(51) Int. Cl.
*G09B 21/00* (2006.01)
*G06K 7/10* (2006.01)
*G06K 19/07* (2006.01)

(52) U.S. Cl.
CPC ....... *G09B 21/004* (2013.01); *G06K 7/10297* (2013.01); *G06K 19/0723* (2013.01); *G09B 21/007* (2013.01)

(58) Field of Classification Search
CPC ............... G09B 21/004; G09B 21/007; G06K 7/10297; G06K 19/0723
See application file for complete search history.

(56) References Cited

U.S. PATENT DOCUMENTS

| 2,456,155 A | 12/1948 | Seaman |
| 3,869,813 A | 3/1975 | Hancy |
| 8,287,280 B2 * | 10/2012 | Wolf .................... G09B 23/02 434/188 |
| 2003/0099920 A1 | 5/2003 | Edwards |
| 2009/0004632 A1 * | 1/2009 | Yau ....................... G09B 21/02 434/115 |

FOREIGN PATENT DOCUMENTS

| GB | 1540799 | 2/1979 |
| JP | H11157201 A | 6/1999 |
| JP | 3143306 U | 6/2008 |
| JP | 4147494 B1 | 7/2008 |
| KR | 10-0491108 | 5/2005 |
| KR | 10-0849449 | 7/2008 |
| KR | 20-2009-0000338 | 1/2009 |
| KR | 10-1650099 | 8/2016 |
| KR | 10-2016-0113760 | 10/2016 |
| KR | 10-2017-0051831 | 5/2017 |
| KR | 1020170119941 | 10/2017 |
| WO | 2009086308 | 7/2009 |

* cited by examiner

*Primary Examiner* — Ahshik Kim
(74) *Attorney, Agent, or Firm* — Revolution IP, PLLC

(57) ABSTRACT

Provided is a braille teaching material, and a method of manufacturing the same. More particularly, the present disclosure relates to a braille teaching material, and a method of manufacturing the same, wherein by magnetic force, a teaching tool is attached to a dot corresponding to a raised dot of braille among vertical dots and horizontal dots of braille, so that even braille beginners with undeveloped fingertip sensitivity are able to learn braille.

14 Claims, 15 Drawing Sheets

~1100

~1210

~220

~1220

~1210

~1100

1100

1210

220

1210

BRAILLE TEACHING MATERIAL AND METHOD OF MANUFACTURING SAME

CROSS REFERENCE TO RELATED APPLICATION

The present application claims priority to Korean Patent Application No. 10-2020-0100057, filed Aug. 10, 2020, the entire contents of which is incorporated herein for all purposes by this reference.

TECHNICAL FIELD

The present disclosure relates to a braille teaching material, and a method of manufacturing the same. More particularly, the present disclosure relates to a braille teaching material, and a method of manufacturing the same, wherein by magnetic force, a teaching tool is attached to a dot corresponding to a raised dot of braille among vertical dots and horizontal dots of braille, so that even braille beginners with undeveloped fingertip sensitivity are able to learn braille.

BACKGROUND

Braille is a character symbol system that gives meaning to various dot patterns so that people can read and write through the sense of touch. In general, 3*2 or 4*2 dot patterns are widely used for such braille, and the character system is constructed by varying the number and arrangement of dots.

For people who are visually impaired, braille is not just a simple means of accessing information access, but a key means of providing opportunities to live much better.

Braille education provides more educational opportunities, communication with the world, and even more various occupations and economical opportunities.

There are about 285 million people who are visually impaired around the world, but only around 10% of them are able to read and write braille (including people with low vision).

Currently, there is a shortage of specialized teachers in the field of braille education, and there is also a shortage of interesting educational materials and tools for visually-impaired children to access braille easily.

Actual printed braille is small. Braille beginners with undeveloped fingertip sensitivity, diabetic patients with sensory impairment, people visually impaired due to age, and the like have difficulty in learning and getting used to braille in the actual size, so many visually handicapped people give up.

A picture book in braille, and a teaching material set including the same are disclosed in Korean Patent No. 10-0849449.

The foregoing is intended merely to aid in the understanding of the background of the present disclosure, and is not intended to mean that the present disclosure falls within the purview of the related art that is already known to those skilled in the art.

Document of Related Art (Patent Document 1) Korean Patent No. 10-0849449 (registration date: Jul. 24, 2008)

SUMMARY

Accordingly, the present disclosure has been made keeping in mind the above problems occurring in the related art, and the present disclosure is directed to providing a braille teaching material, and a method of manufacturing the same, wherein by magnetic force, a teaching tool is attached to a dot corresponding to a raised dot of braille among vertical dots and horizontal dots of braille, so that even braille beginners with undeveloped fingertip sensitivity are able to learn braille.

The objective of the embodiments of the present disclosure is not limited to the above-described objective, and other objectives which are not described herein will be come apparent to those skilled in the art from the following description.

According to an embodiment of the present disclosure, there is provided a braille teaching material including: an information section (100) showing learning information, not braille, to be used for learning, in a preset learning area; a braille section (200) showing dots (210) corresponding to vertical dots and horizontal dots of braille, in a preset braille area, and provided with a magnetic part (220) at some or all of positions where the dots (210) are arranged, the magnetic part (220) being made of a magnet, a ferromagnetic substance, or a paramagnetic substance; and a teaching tool (300) detachably attached to the dot (210) due to attractive force caused by magnetic force to the magnetic part (220).

The information section (100) shows the information provided in an uneven shape.

When the information to be used for learning is a letter, the information section (100) includes a stroke part (110) indicating a direction in which each stroke of the letter is written.

When the information to be used for learning is a letter, the information section (100) includes a start part (120) indicating a point at which each stroke of the letter starts.

The braille teaching material further includes a stroke order guidance section (400) in a preset area of opened pages of the braille teaching material, the stroke order guidance section (400) showing symbols that correspond to the start parts (120) and are arranged in the same order as the strokes of the letter are written.

The braille section (200) shows which dot (210) corresponds to a raised dot of braille, in a visual manner, in a tactile manner, or in a visual and tactile manner.

The braille section (200) includes the magnetic part (220) that is made of the magnet, the ferromagnetic substance, or the paramagnetic substance, and provided at a position of the dot (210) corresponding to a raised dot of braille that represents the information shown in the information section (100).

In the braille section (200), coating printing with an epoxy material is performed at a position of the dot (210) corresponding to the raised dot of braille.

The braille teaching material further includes an NFC tag (not shown) provided in a preset tag area, and storing information required for voice guiding the learning information; and an NFC reader (not shown) outputting the learning information in a voice when recognizing the NFC tag (not shown).

A sheet provided with the dots (210) is formed by stacking, in order, an outer layer (1100) in which the dots (210) are formed in a hole shape, and an inner layer (1200) to which the magnetic part (220) is fixed.

The inner layer (1200) contains a magnetic part covering layer (1210) placed at an upper side, at a lower side, or at an upper side and a lower side of the magnetic part (220).

The inner layer (1200) contains a magnetic-part-holding layer (1220) that is provided with a fitting hole (1221) into which the magnetic part (220) is interlocked.

The inner layer (1200) is subjected to punch processing so that in a layer made of a magnet, a ferromagnetic substance, or a paramagnetic substance, borders of the layer and a portion of the layer which is matched to the dot (210) corresponding to a raised dot of braille are left and a portion of the layer which is matched to the dot (210) corresponding to an unraised dot of braille is eliminated.

According to an embodiment of the present disclosure, there is provided a method of manufacturing a braille teaching material, the method including: punching, at an outer layer punching step (S10), the dots (210) in the outer layer (1100); fixing, at a magnetic part fixing step (S20), a position of the magnetic part (220) to the inner layer (1200); and manufacturing, at a sheet manufacturing step (S30), the sheet provided with the dots (210) by stacking the outer layer (1100) and the inner layer (1200) or by stacking the outer layer (1100), the inner layer (1200), and the outer layer (1100) in order and bonding the layers.

In the braille teaching material and the method of manufacturing the same according to an embodiment of the present disclosure, a teaching tool is attached by magnetic force to a dot corresponding to a raised dot of braille among vertical dots and horizontal dots of braille, so that even braille beginners with undeveloped fingertip sensitivity are able to learn braille.

In addition, since the information section is provided in an uneven shape, the visually impaired person is able to identify the learning information alone and is thus able to learn braille alone.

In addition, since the direction in which each stroke of a letter is written is provided, the visually impaired person is able to identify in which direction the visually impaired person needs to touch and follow the letter, so that the visually impaired person is able to easily identify the letter.

In addition, since the point at which each stroke of a letter starts is provided, the point at which the stroke of the letter starts is quickly identified, so that the time required to identify the letter is shortened.

In addition, the stroke order guidance section in which symbols are arranged in the same order as strokes of a letter are written is provided, so that the visually impaired person is able to learn the stroke order of the letter.

In addition, which dot corresponds to the raised dot of braille is provided in a visual manner, in a tactile manner, or in a visual and tactile manner, so that even people who do not know braille are able to help the visually impaired person to learn braille.

In addition, a braille section are formed, where a magnetic part in a powder form is mixed with an adhesive and is attached to the position of the dot corresponding to the raised dot of braille, so that it is easy for unimpaired people and the visually impaired people to identify which dot corresponds to the raised dot of braille, without any indications.

In addition, since a sheet provided with dots is formed by stacking the outer layer and the inner layer, the outer layer and the inner layer are separately manufactured and are bonded, whereby manufacturing a sheet provided with dots is facilitated.

In addition, the inner layer contains the magnetic part covering layer to make it difficult to find where the magnetic part is, thereby helping with various usages for braille teaching.

In addition, since the inner layer contains the magnetic-part-holding layer, the magnetic part is prevented from being detached from the designated position.

In addition, the inner layer is manufactured through punch processing, the magnetic part is effectively prevented from being detached from the designated position.

Further, the braille teaching material is manufactured through the outer layer punching step, the magnetic part fixing step, and the sheet manufacturing step, whereby the braille teaching material can be made more easily.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Figure 1:
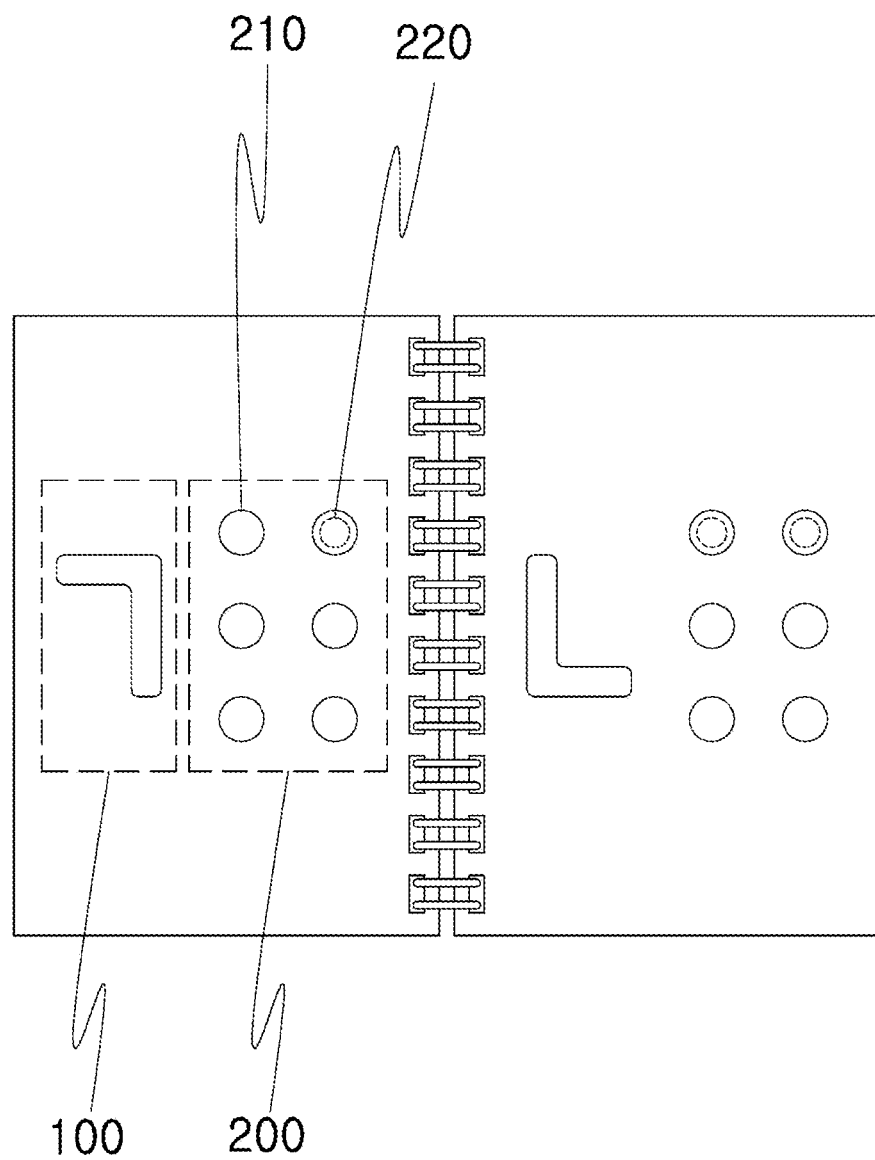
FIG. 1 is a diagram illustrating a braille teaching material according to an embodiment of the present disclosure, specifically, an example in which an information section and a braille section are provided on one page.

The present disclosure may be modified in various ways and implemented by various embodiments, so that specific embodiments are shown in the drawings and will be described in detail. However, the present disclosure is not limited to the specific embodiments, but may include all modifications, equivalents and substitutions within the scope of the present disclosure.

It will be understood that when an element is referred to as being "connected" or "coupled" to another element, it can be directly connected or coupled to the other element or intervening elements may be present.

In contrast, when an element is referred to as being "directly connected" or "directly coupled" to another element, there are no intervening elements present.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises", "comprising", "includes", and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Herein, with reference to the accompanying drawings, embodiments of the present disclosure will be described in detail. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. In addition, technical terms and scientific terms used in the present specification have the general meaning understood by those skilled in the art to which the present disclosure pertains unless otherwise defined, and a description for the known function and configuration obscuring the present disclosure will be omitted in the following description and the accompanying drawings. The drawings to be provided below are provided by way of example so that the idea of the present disclosure can be sufficiently delivered to a person skilled in the art to which the present disclosure pertains. Therefore, the present disclosure is not limited to the drawings provided below but may be modified in many different forms. In addition, like reference numerals designate like elements throughout the specification. In the drawings, same reference numerals denote same components throughout the disclosure.

Figure 2:
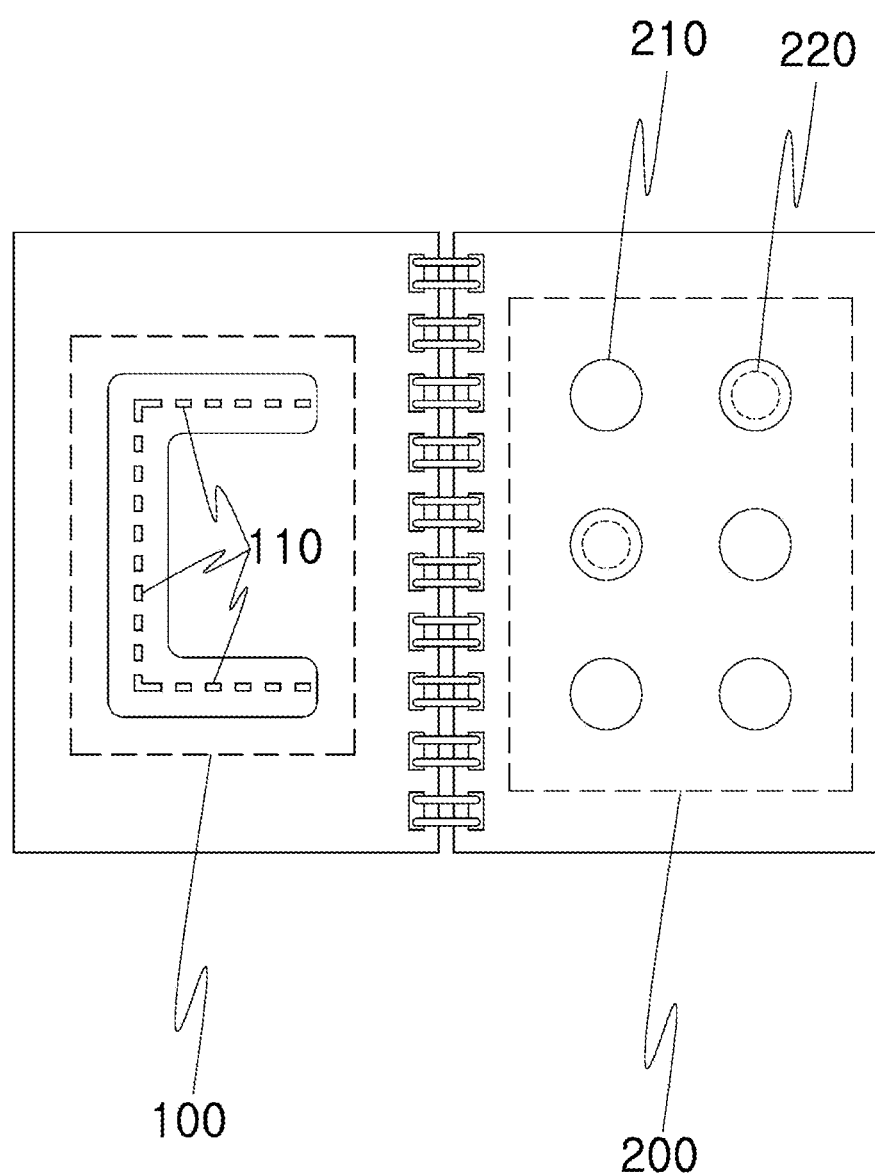
FIG. 2 is a diagram illustrating a braille teaching material according to an embodiment of the present disclosure, specifically, an example in which among opened pages of the braille teaching material, one page is provided with an information section and the other page is provided with a braille section, and in which a stroke part is provided.
Figure 3:
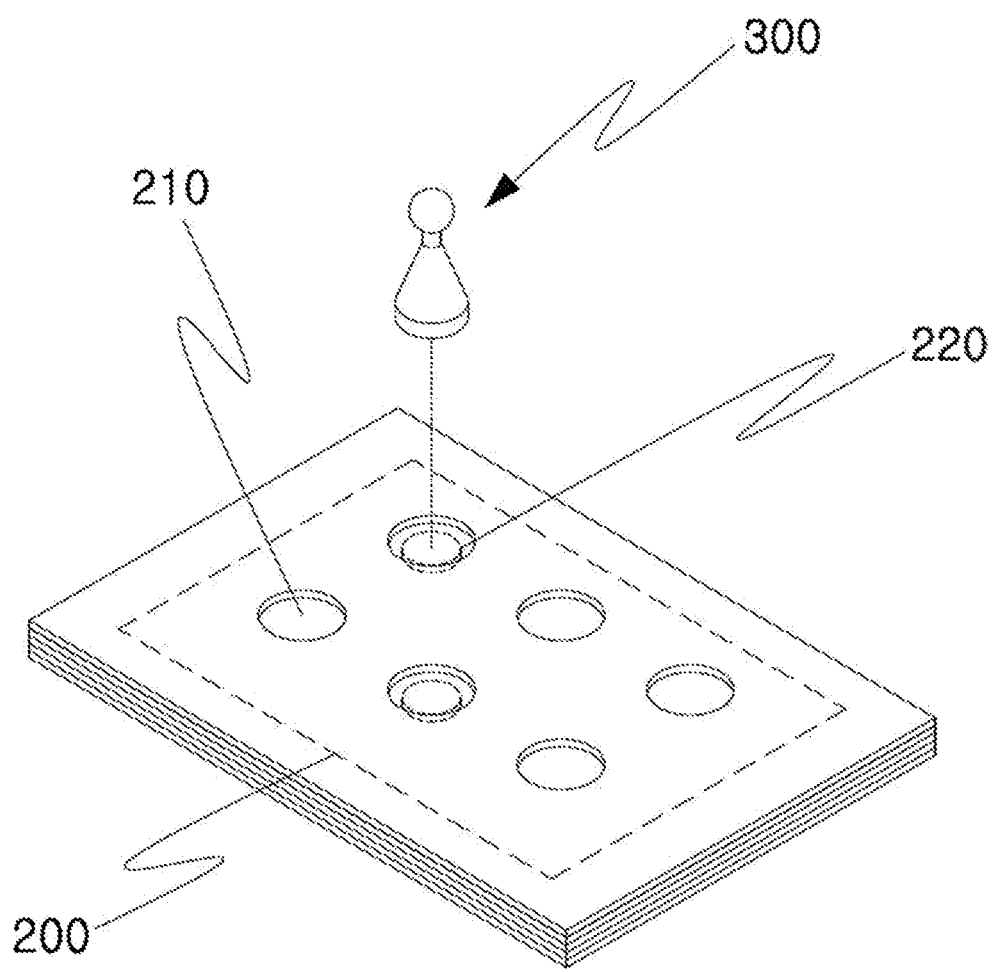
FIG. 3 is a diagram illustrating a braille teaching material according to an embodiment of the present disclosure, specifically, an example in which a teaching tool is attached to a dot provided with a magnetic part in a page where a braille section is provided.
Figure 4:
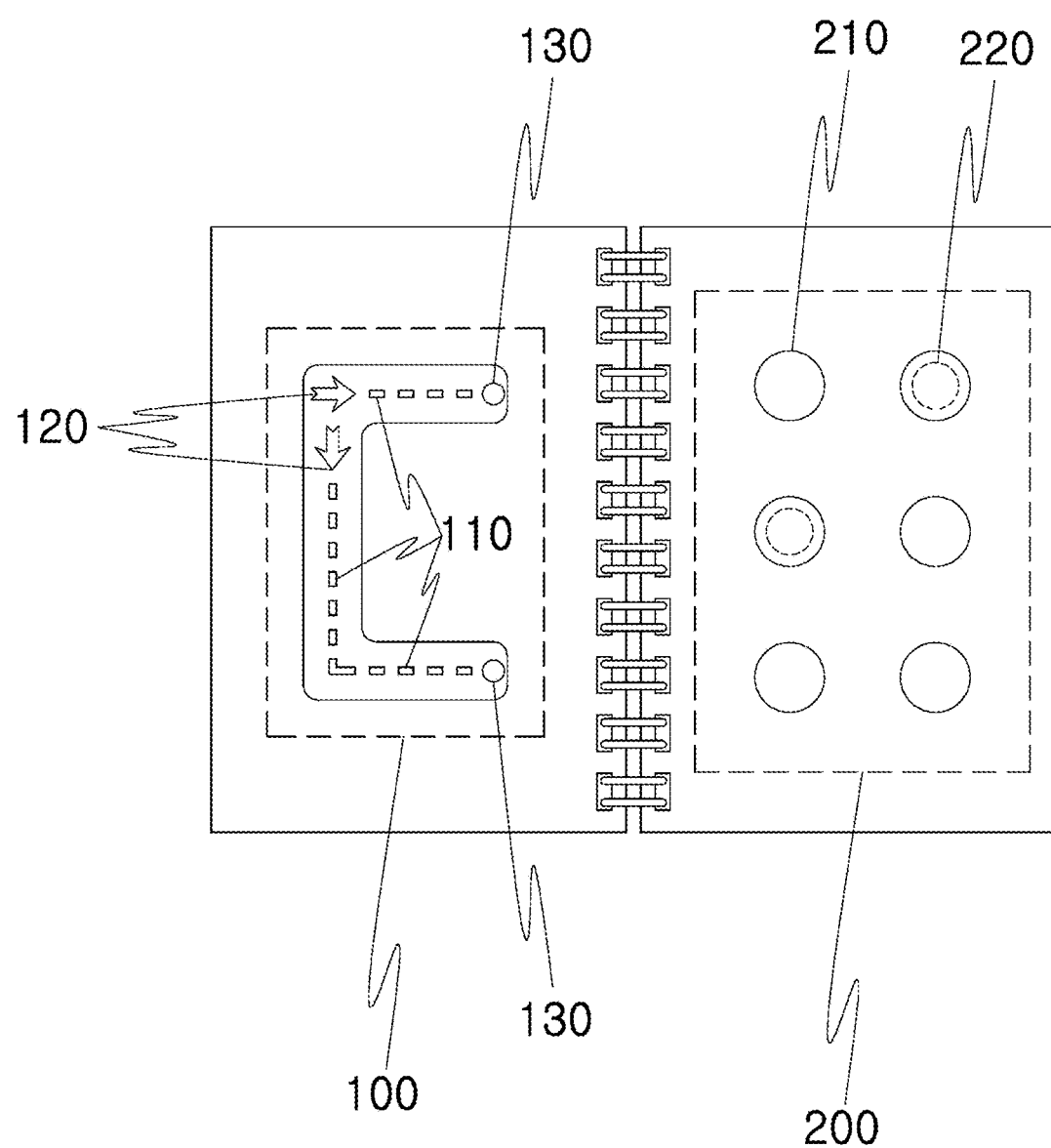
FIG. 4 is a diagram illustrating an example in which a start part and an end part are added to the example of FIG. 2.
Figure 5:
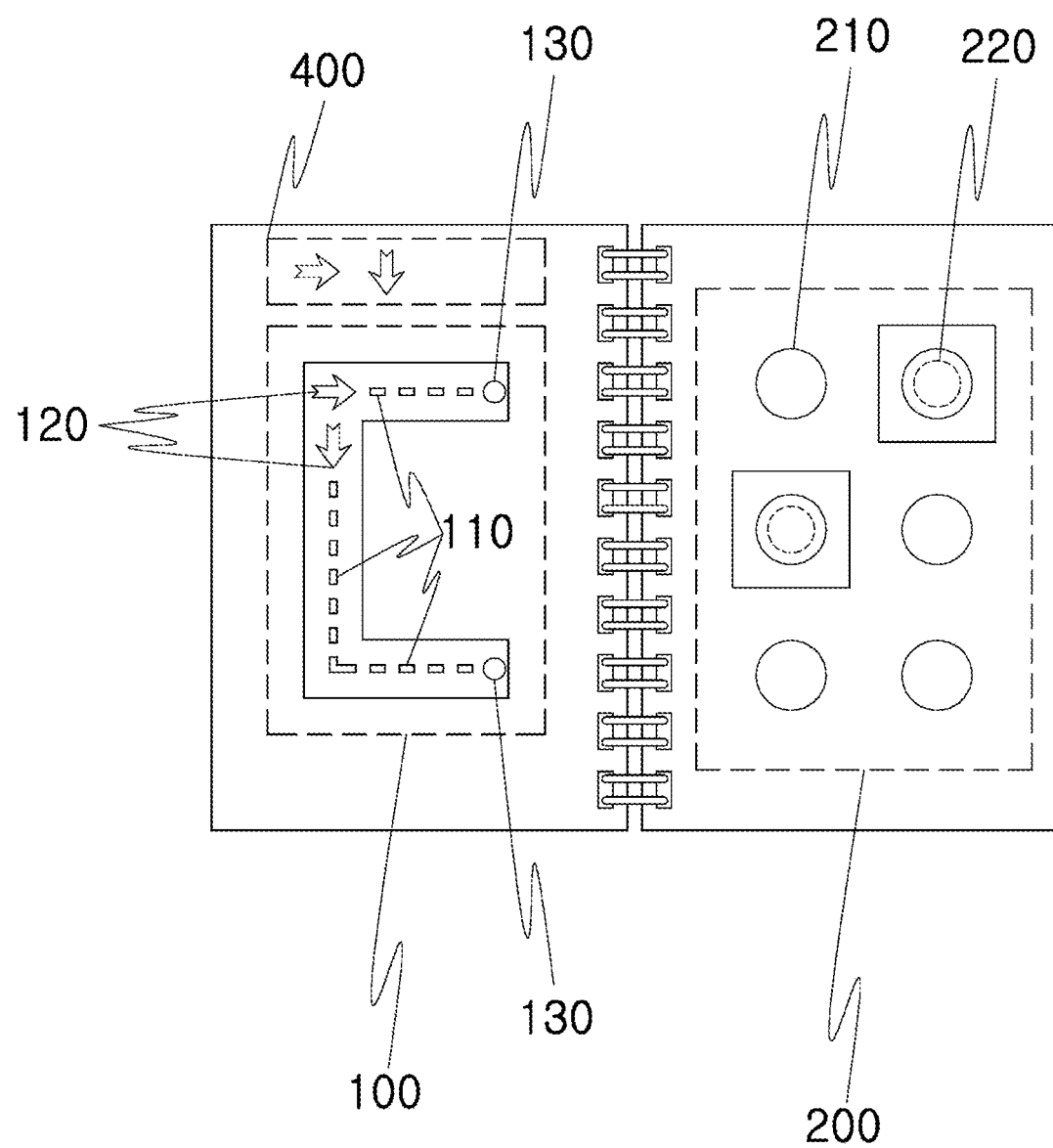
FIG. 5 is a diagram illustrating an example in which a stroke order guidance section is added to the example of FIG. 4.
Figure 6:
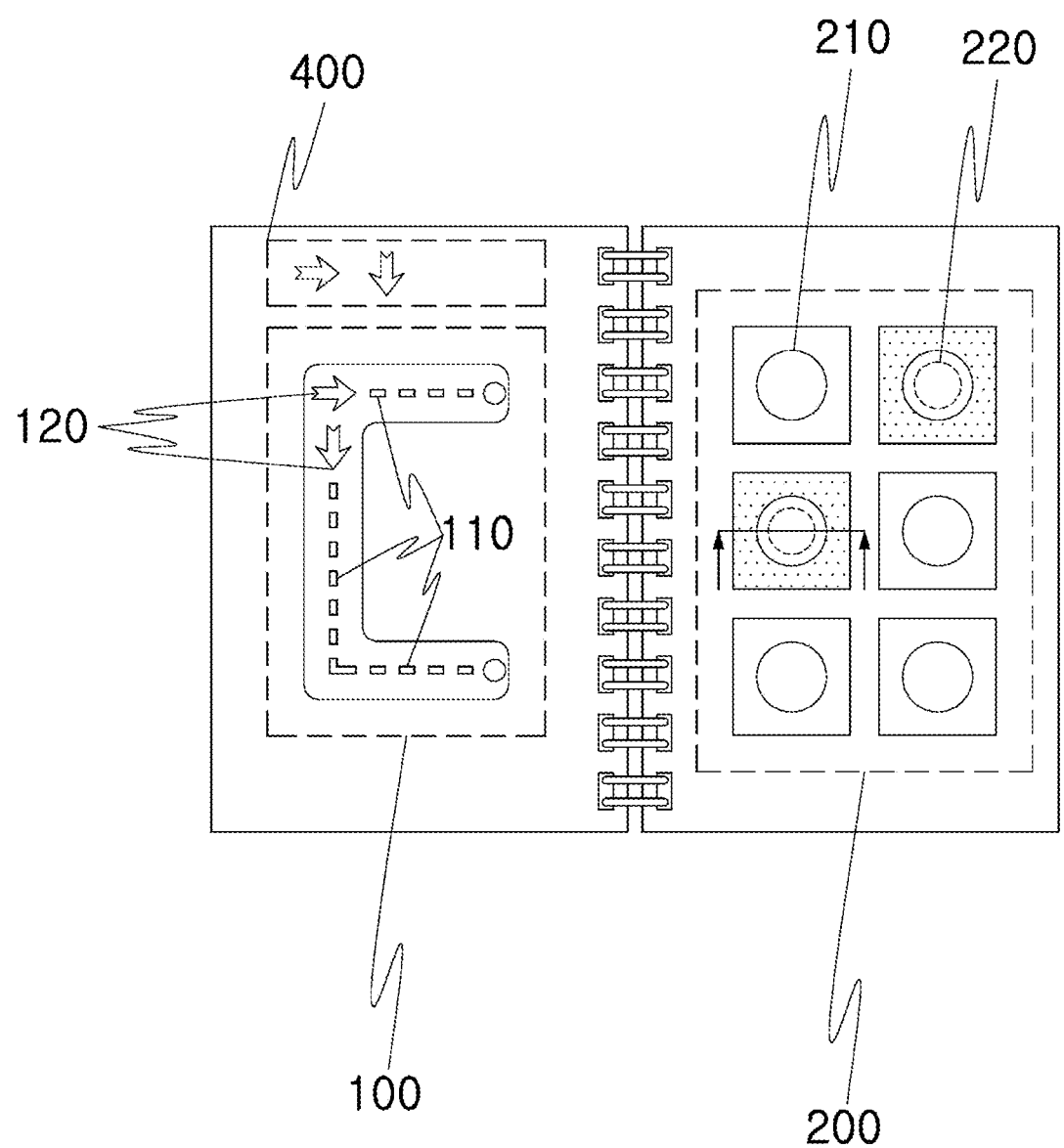
FIG. 6 is a diagram illustrating an example in which raised dots of braille of FIG. 5 are provided in a visual manner, in a tactile manner, or in a visual and tactile manner.
Figure 7:
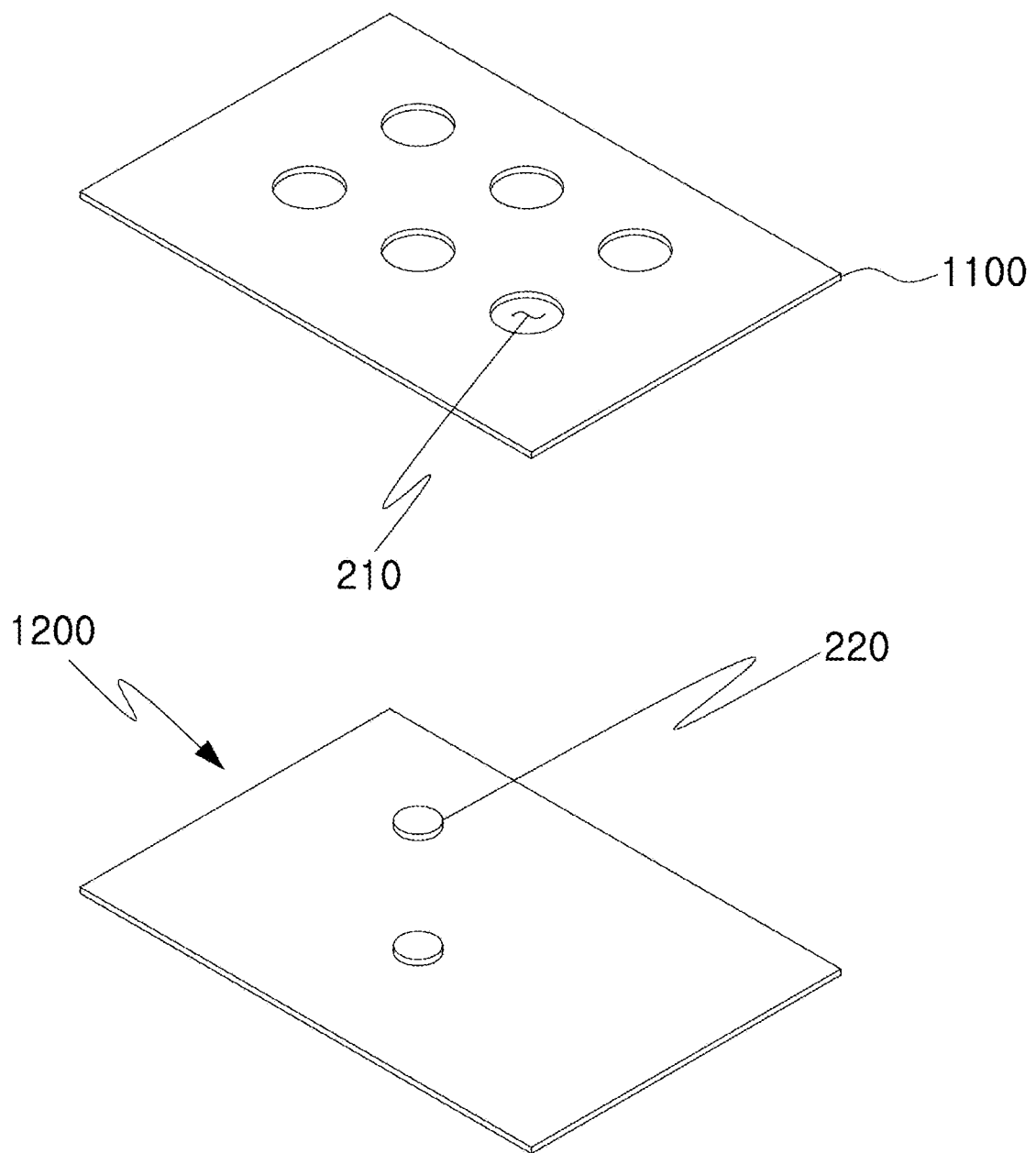
FIG. 7 is a diagram illustrating an example in which a magnetic part in a powder form is mixed with an adhesive and is attached to a position where the magnetic part needs to be provided, on a page provided with a braille section of a braille teaching material according to an embodiment of the present disclosure.
Figure 8:
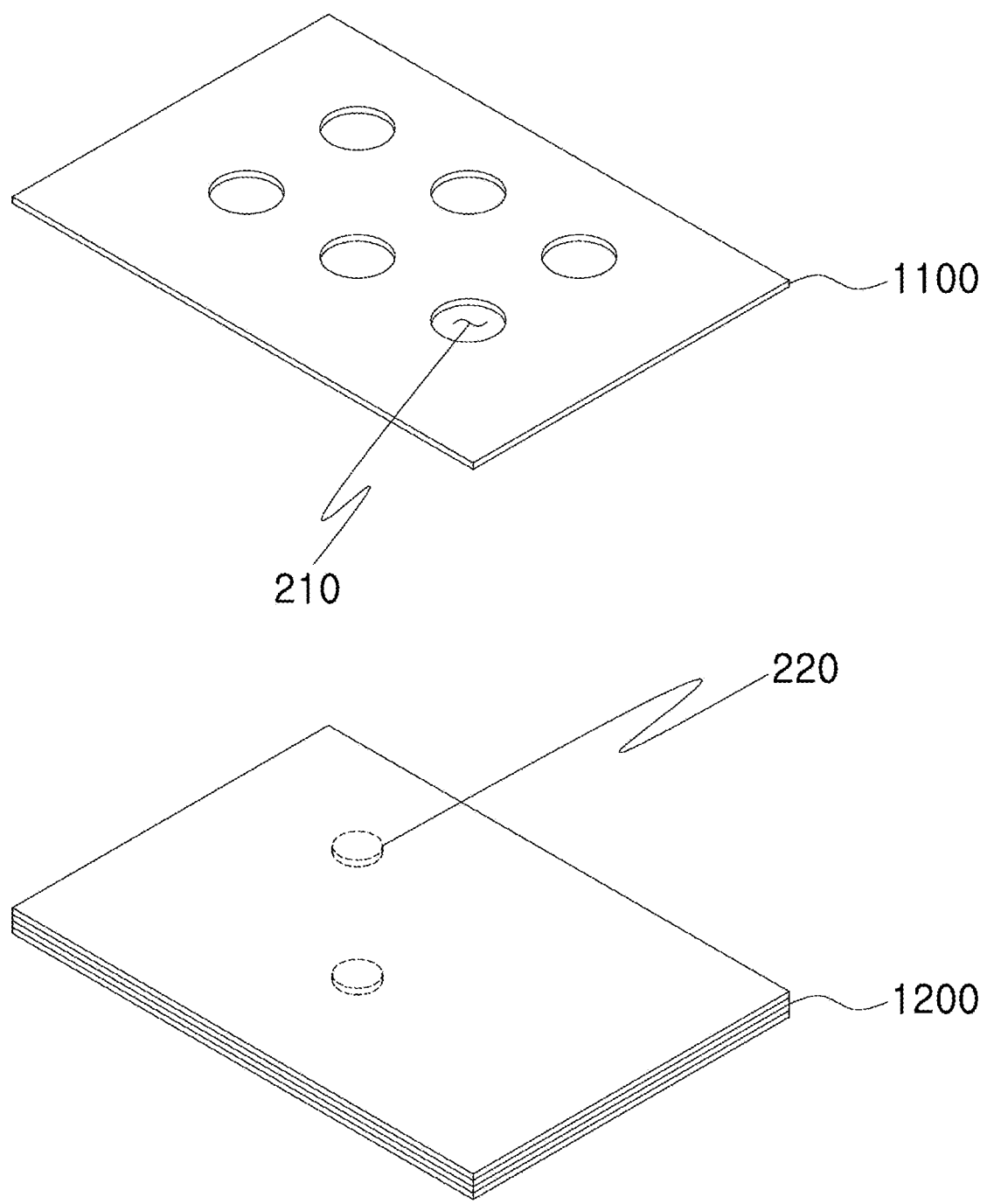
FIG. 8 is a diagram illustrating an example in which a sheet where a braille section of a braille teaching material is provided is manufactured by stacking an outer layer and an inner layer, according to an embodiment of the present disclosure.
Figure 12:
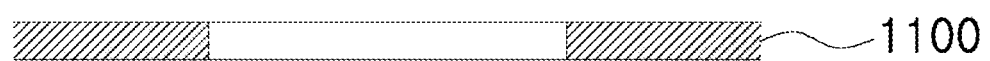
Figure 12:
Figure 12:
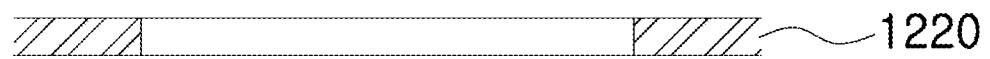
Figure 12:
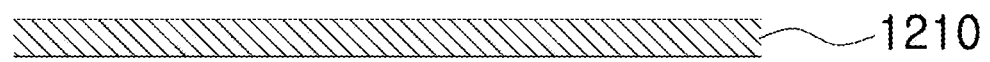
Figure 12:
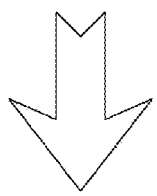
Figure 12:
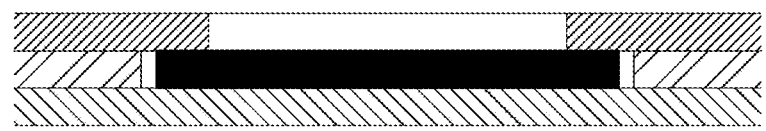
Figure 13:
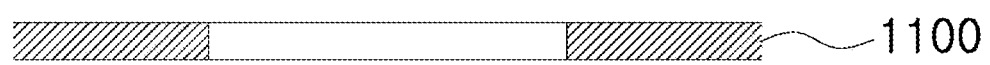
Figure 13:
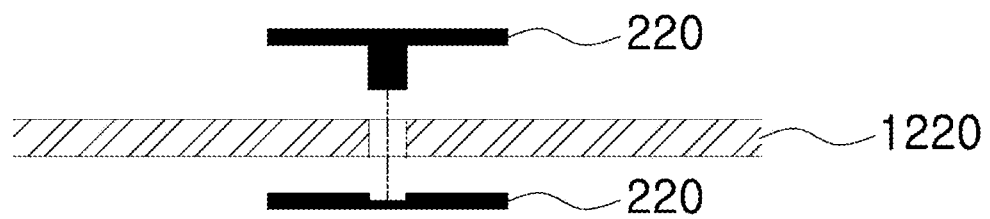
Figure 13:
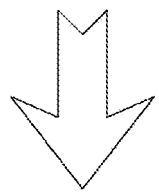
Figure 13:
Figure 14:
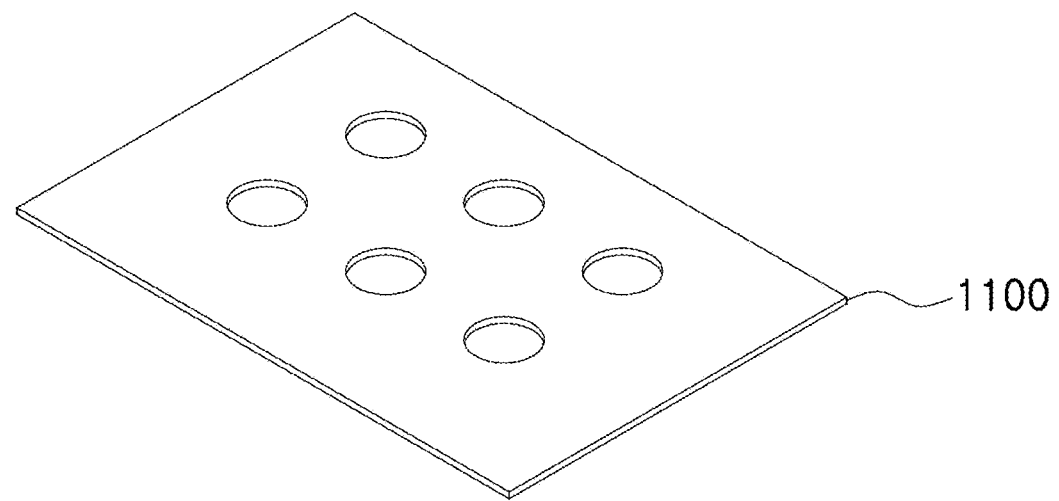
FIG. 14 is a diagram illustrating an example of an inner layer of a braille teaching material subjected to punch processing, according to an embodiment of the present disclosure.
Figure 14:
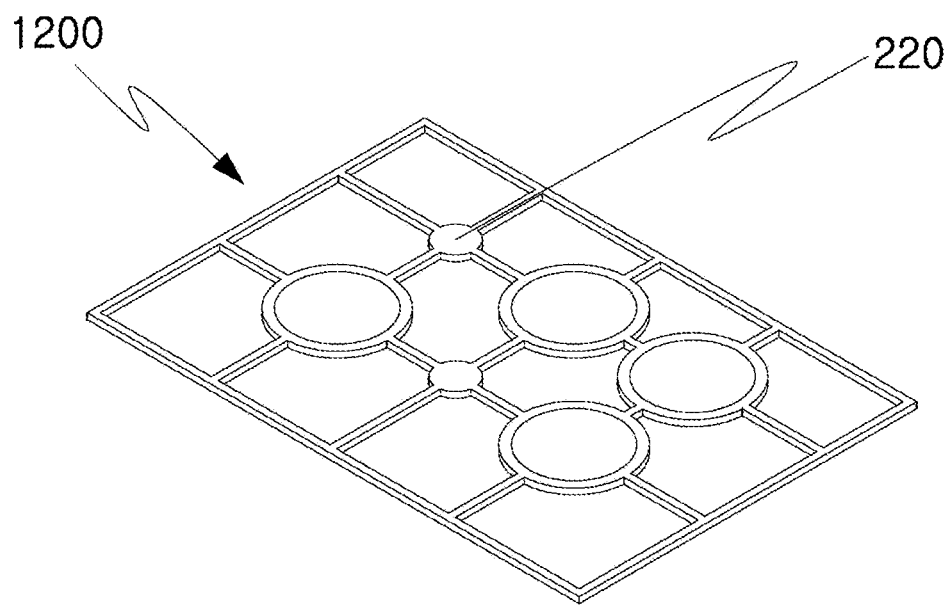
Figure 15:
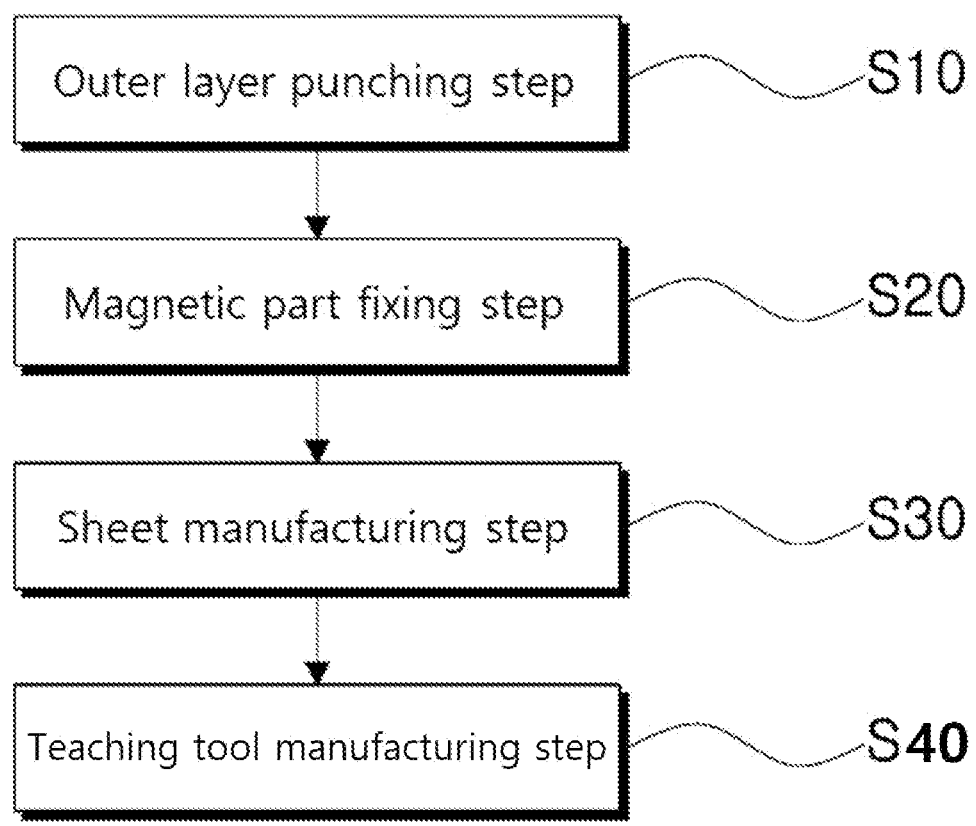
FIG. 15 is a flowchart illustrating a method of manufacturing a braille teaching material according to an embodiment of the present disclosure.

FIG. 1 is a diagram illustrating a braille teaching material according to an embodiment of the present disclosure, specifically, an example in which an information section and a braille section are provided on one page. FIG. 2 is a diagram illustrating a braille teaching material according to an embodiment of the present disclosure, specifically, an example in which among opened pages of the braille teaching material, one page is provided with an information section and the other page is provided with a braille section, and in which a stroke part is provided. FIG. 3 is a diagram illustrating a braille teaching material according to an embodiment of the present disclosure, specifically, an example in which a teaching tool is attached to a dot provided with a magnetic part in a page where a braille section is provided. FIG. 4 is a diagram illustrating an example in which a start part and an end part are added to the example of FIG. 2. FIG. 5 is a diagram illustrating an example in which a stroke order guidance section is added to the example of FIG. 4. FIG. 6 is a diagram illustrating an example in which raised dots of braille of FIG. 5 are provided in a visual manner, in a tactile manner, or in a visual and tactile manner. FIG. 7 is a diagram illustrating an example in which a magnetic part in a powder form is mixed with an adhesive and is attached to a position where the magnetic part needs to be provided, on a page provided with a braille section of a braille teaching material according to an embodiment of the present disclosure. FIG. 8 is a diagram illustrating an example in which a sheet where a braille section of a braille teaching material is provided is manufactured by stacking an outer layer and an inner layer, according to an embodiment of the present disclosure. FIGS. 9 to 13 are diagrams illustrating separation and combination of cross sections taken along the cutting-plane line of FIG. 6 according to various embodiments. FIG. 14 is a diagram illustrating an example of an inner layer of a braille teaching material subjected to punch processing, according to an embodiment of the present disclosure. FIG. 15 is a flowchart illustrating a method of manufacturing a braille teaching material according to an embodiment of the present disclosure.

According to an embodiment of the present disclosure, an braille teaching material includes an information section 100, a braille section 200, and a teaching tool 300.

The information section 100 shows learning information, not braille, to be used for learning in a preset learning area.

Herein, the learning information refers to information, such as a character (a letter, a number, a sign, or the like), an image, or the like, for braille learning.

In FIG. 1, the information section 100 is provided on the left side of a page and is sections where the Korean letters "ㄱ" and "ㄴ" are shown. In FIG. 2, the information section 100 is provided on the left page among the opened pages of the braille teaching material and is a section where the Korean letter "ㄷ" is shown.

FIGS. 1 and 2 show that the information section 100 is provided on the left side with respect to the braille section 200 which will be described later, but the present disclosure is not limited thereto. The information section 100 may be embodied in various ways as being provided on the right side, the upper side, the lower side, and the like with respect to the braille section 200.

The braille section 200 shows dots 210 corresponding to vertical dots and horizontal dots of braille in a preset braille area. The braille section 200 is provided with a magnetic part 220 at some or all the positions where the dots 210 are arranged, and the magnetic part 220 is made of a magnet, a ferromagnetic substance, or a paramagnetic substance.

In the braille section 200, the showing of the dots 210 corresponding to the vertical dots and horizontal dots of braille means that the dots 210 are shown in such a manner as to be distinguished from other parts, and also means that the dots 210 are distinguished in a visual and tactile manner. This is because the braille teaching material is for the visually impaired.

Herein, it is preferable to form the dots 210 in an engraved shape so as to be distinguished from other parts.

This is to serve as a guide when attaching the teaching tool 300 which will be described later to the position corresponding to the dot 210.

In other words, when attaching the teaching tool 300 to the dot 210, it is identified that the teaching tool 300 is attached into the area recessed compared with other parts, whereby it is easy to identify whether the teaching tool 300 is attached to the correct position corresponding to the dot 210.

Herein, the magnetic part 220 may be formed (not shown) in a plate shape (a shape of a broken line corresponding to the reference numeral 200 of FIG. 1, a shape of an area including the reference numerals 100 and 200 of FIG. 1, or the like) so as to cover all the areas where the dots 210 are shown.

Although the magnetic part 220 formed in the plate shape so as to cover all the areas where the dots 210 are shown is described above as an example, the present disclosure is not limited thereto. The magnetic part 220 may be embodied in various ways as being provided only in some areas which will be described later (see FIGS. 1 and 3).

The teaching tool 300 is detachably attached to the dot 210 due to attractive force caused by magnetic force to the magnetic part 220 (see FIG. 3).

For example, in the case where the magnetic part 220 is made of a paramagnetic substance such as iron, or the like, the teaching tool 300 may be provided with a magnet.

In this case, preferably, the teaching tool 300 is formed in such a manner that the lower part of the teaching tool 300 is provided with a magnet, a ferromagnetic substance, or a paramagnetic substance, and the upper part of the teaching tool 300 is gripped by hand.

When the user holds the teaching tool 300 in the user's hand and moves the teaching tool 300 to pass between the dots 210, the teaching tool 300 is attached to the dot 210 provided with the magnetic part 220 due to magnetic force.

It is preferable that an attached surface (lower surface), which corresponds to a magnet, of the teaching tool 300 has a pole that is the same as that of another teaching tool 300.

This is to minimize, even if children swallow the teaching tools 300, accidents (enterobrosia (intestinal perforation) that may occur when the magnets attract each other with the intestine in the middle and compress the intestine, intestinal obstruction, infection, sepsis, and the like) that may occur due to strong attachment to each other in the stomach.

In the braille teaching material according to an embodiment of the present disclosure, the teaching tool 300 is attached to the position of the dot 210 corresponding to the raised dot of braille, so that even those who have undeveloped fingertip sensitivity are able to learn the shape of braille.

This is because braille can be learned more quickly by learning the shape of braille using a teaching material with a large braille size and then learning while reducing the size.

According to an embodiment of the present disclosure, the information section 100 of the braille teaching material may be characterized in the information is provided in an uneven shape.

That is, the learning information shown in the information section 100 may be provided in an uneven shape.

In other words, the learning information shown in the information section 100 may be provided in an uneven shape, such as an engraved shape, a raised shape, an embossed shape, or the like, which is distinguished by the touch of hand.

This is to enable the visually impaired person to identify learning information alone, and thus the visually impaired person is able to learn braille alone.

Although it is described that the information section 100 is provided in an uneven shape, as an example, the present disclosure is not limited thereto. The information section 100 may be embodied in various ways as being provided only as a general image, as a combination of a general image and an uneven shape, and the like.

According to an embodiment of the present disclosure, the information section 100 of the braille teaching material may include an engraved part (not shown) in which the information is formed in an engraved shape, and a raised part (not shown) that corresponds to the shape of the engraved part (not shown) and is formed in such a manner as to be interlocked to the engraved part (not shown).

Through this, the visually impaired person is able to easily identify the shape of the learning information alone.

That is, the user is able to learn by touching the engraved part (not shown) and identifying the learning information in the engraved shape, and learn by touching the raised part (not shown) and identifying the learning information in the raised shape.

The raised part (not shown) may be formed in such a manner as to be interlocked to the engraved part (not shown), but the forcible interlocking form is likely to be damaged due to the material characteristics of the teaching tool. Therefore, it is preferable that the raised part (not shown) is attached to the engraved part (not shown) using magnetic force.

That is, various embodiments are possible, for example the raised part (not shown) is provided with a magnet, the raised part (not shown) is made of a magnet, and so on.

As shown in FIG. 2, according to an embodiment of the present disclosure, in the case where information to be used for learning is a letter, the information section 100 of the braille teaching material includes a stroke part 110 indicating a direction in which each stroke of the letter is written.

The stroke part 110 is for informing how to write the strokes of the letter, and the direction of proceeding. The teacher who helps with learning may refer to the stroke part 110 to guide the learner.

Herein, the stroke part 110 may be provided in an uneven shape.

This is to help the learner to learn the letter alone. Herein, the stroke part 110 may serve as a guide so that the visually impaired person is able to identify in which direction the visually impaired person needs to touch and follow the letter.

Referring to FIG. 2, in the case where the stroke part 110 is formed in a raised shape, for example, only the stroke part 110 may be formed in a raised shape, but the "☐"-shaped border surrounding the stroke part 110 or the entire learning information may be formed in a raised shape.

FIG. 2 shows the stroke part 110 in a shape of broken line, but the present disclosure is not limited thereto. The stroke part 110 may be embodied in various ways, such as angle brackets (>), triangles (Δ), arrows (→), or the like.

As shown in FIG. 4, according to an embodiment of the present disclosure, in the case where information to be used for learning is a letter, the information section 100 of the braille teaching material includes start parts 120 each indicating a point at which each stroke of the letter starts.

The start part 120 is for informing where the stroke of the letter needs to start, and the point of the start. The teacher who helps with learning may refer to the start part 120 to guide the learner.

The start part 120 may be provided in various ways, for example, numbers, letters, figures, images, or the like.

As shown in FIG. 2, in the case where only the stroke part 110 is formed, the visually impaired person needs to pay attention around the letter with the fingers so as to identify the start and the end of the letter, and thus it takes time to identify the letter.

In order to help the learner to learn the letter alone, the start part 120 may be provided in an uneven shape.

The start part 120 enables the point at which the stroke of the letter starts to be identified quickly, and thus the time required to identify the letter is shortened.

As shown in FIG. 4, according to an embodiment of the present disclosure, in the case where information to be used for learning is a letter, the information section 100 of the braille teaching material includes end parts 130 each indicating a point at which each stroke of the letter ends.

The end part 130 is for information where the stroke of the letter needs to end, and the point of the end. The teacher who helps with learning may refer to the end part 130 to guide the learner.

The end part 130 may be provided in various ways, for example, numbers, letters, figures, images, or the like.

As shown in FIG. 2, in the case where only the stroke part 110 is formed, the visually impaired person needs to pay attention around the letter with the fingers so as to identify the start and the end of the letter, and thus it takes time to identify the letter.

In order to help the learner to learn the letter alone, the end part 130 may be provided in an uneven shape.

The end part 130 enables the point at which the stroke of the letter ends to be identified quickly, and thus the time required to identify the letter is shortened.

Therefore, it is preferable that both of the start part 120 and the end part 130 are provided.

As shown in FIG. 5, according to an embodiment of the present disclosure, the braille teaching material may further include a stroke order guidance section 400 in a preset area of the opened pages of the braille teaching material. The stroke order guidance section 400 shows symbols that correspond to the start parts 120 and are arranged in the same order as the strokes of the letter are written.

The stroke order guidance section 400 is for informing the stroke order of the letter. The teacher who helps with learning may refer to the stroke order guidance section 400 to guide the learner.

The stroke order guidance section 400 is for the visually impaired person to learn the stroke order of the letter.

That is, the number of strokes of the letter is identified using the number of start parts 120 provided in the stroke order guidance section 400. The order in which the strokes need to be written is identified from the stroke order guidance section 400.

In order to help the learner to learn the letter alone, the stroke order guidance section 400 may be provided in an uneven shape.

In FIG. 5, the stroke order guidance section 400 is provided at the upper left position, but the stroke order guidance section 400 may be positioned anywhere without being limited thereto.

As shown in FIGS. 5 and 6, according to an embodiment of the present disclosure, the braille section 200 of the braille teaching material shows which dots 210 correspond to the raised dots of braille, in a visual manner, in a tactile manner, or in a visual and tactile manner.

The dots 210 correspond to the raised dots may be embodied in various ways. For example, in terms of the visual sense, the dots 210 may be provided in outline, an ambient portion of the dots 210 may be provided in color, or the dots 210 may be provided in color. In terms of the tactile sense, the outline may be provided in an uneven shape, or the inside of the outline may be provided in an uneven shape.

This enables not only the visually impaired people but also the unimpaired people to identify which dots 210 correspond to the raised dots of braille, whereby even the unimpaired people who do not know braille are able to help the visually impaired person to learn braille.

That is, it is to easily identify whether the teaching tool 300 is attached to the correct position.

As shown in FIGS. 1 to 3, according to an embodiment of the present disclosure, the braille section 200 of the braille teaching material may include a magnetic part 220 made of a magnet, a ferromagnetic substance, or a paramagnetic substance, at the positions of the dots 210 corresponding to the raised dots of braille that represent the information shown in the information section 100.

That is, among the dots 210, the magnetic parts may be provided only at the positions of the dots 210 corresponding to the raised dots of braille that represent the information shown in the information section 100.

This is to enable the teaching tool 300, described later, to be attached by magnetic force.

In FIG. 1, the raised dot of braille representing the Korean letter "ㄱ" corresponds to only one dot 210 at the top right position, and the raised dots of braille representing the Korean letter "ㄴ" correspond to only two dots 210 at the top left position and the top right position. In FIG. 2, the raised dots of braille representing the Korean letter "ㄷ" correspond to only two dots 210 at the top right position and the middle left position.

In FIG. 1, the braille section 200 is provided on the right side of one page, and is a section where the braille letter corresponding to the Korean letter "ㄱ" and the braille letter corresponding to the Korean letter "ㄴ" are shown. In FIG. 2, the braille section 200 is provided on the right page among the opened pages of the braille teaching material, and is a section where the braille letter corresponding to the Korean letter "ㄷ" is shown.

FIGS. 1 and 2 show that the braille section 200 is provided on the right side with respect to the information section 100, but the present disclosure is not limited thereto. The braille section 200 may be embodied in various ways as being provided on the left side, the upper side, the lower side, and the like with respect to the information section 100.

The braille teaching material may be embodied in various ways. For example, the information section 100 and the braille section 200 in a pair may be provided on one opened side (one page) (see FIG. 1), may be provided on both opened sides (two pages) (see FIG. 2), or may be provided on one sheet (the front page and the back page).

Herein, the information section 100 and the braille section 200 in one pair refer to a pair configured to facilitate learning the braille letter corresponding to the learning information of the information section 100 (see FIGS. 1 and 2).

Herein, it is preferable that the information section 100 and the braille section 200 in one pair are provided in a preset learning area and a preset braille area, respectively, of the opened pages of the braille teaching material.

This is because it is possible to learn one letter without turning the page.

As shown in FIG. 7, according to an embodiment of the present disclosure, in the braille section 200 of the braille teaching material, a magnet, a ferromagnetic substance, or a paramagnetic substance in a powder form is mixed with an adhesive, and is provided at the positions of the dots 210 corresponding to the raised dots of braille representing the information shown in the information section 100.

In this case, one page provided with dots 210 may be manufactured using two sheets of paper, or one sheet composed of two pages provided with dots 210 may be manufactured using three sheets of paper.

FIG. 7 shows an example in which one page provided with dots 210 is manufactured using two sheets of paper.

As shown in FIG. 7, according to an embodiment of the present disclosure, in the braille section 200 of the braille teaching material, coating printing with an epoxy material may be performed at the positions of the dots 210 corresponding to the raised dots of braille.

The epoxy material is different from the book material and is thus distinguished in an tactile manner. The portion subjected to coating printing with the epoxy material and the portion not subjected to coating printing may be distinguished from each other in a visual manner.

When the dots 210 corresponding to the raised dots of the braille is to be marked with the epoxy material, a form of stickers, or the like is attached for use. However, in this case, the stickers are likely to be detached when used for a long time.

Therefore, it is preferable to perform coating printing.

Herein, the result of coating printing may be formed in an uneven shape.

According to an embodiment of the present disclosure, the braille teaching material may include an NFC tag (not shown) and an NFC reader (not shown).

The NFC tag (not shown) is provided at a preset tag area, and stores information required for voice guiding the learning information.

When the NFC reader (not shown) recognizes the NFC tag (not shown), the NFC reader outputs the learning information in a voice.

NFC stands for "Near Field Communication" and refers to a wireless communication technology that transmits and receives data at a close range.

It is preferable that the tag area is set to an edge portion of the teaching material (book).

This is because the visually impaired person can most easily find the edge portion of the teaching material (book).

It is preferable that the NFC tag (not shown) is inserted into a page of the book.

This is to prevent the NFC tag (not shown) from being detached due to external contact, or the like.

The NFC tag (not shown) may be provided with a shielding film at a side that is opposite to a designated direction in which the NFC reader (not shown) recognizes the NFC tag, so that the NFC tag is not recognized by the NFC reader (not shown) in an undesired direction.

Accordingly, in the case where the braille teaching material according to an embodiment of the present disclosure is composed of multiple sheets of paper and an NFC tag (not shown) is provided at each sheet, wrong information is prevented from being output due to the NFC tag (not shown) other than information required for the sheet.

For example, when the NFC reader (not shown) is placed close to a tag area at page 1, a NFC tag (not shown) at another page is not recognized by the NFC reader (not shown).

As shown in FIGS. 8 to 12, according to an embodiment of the present disclosure, a sheet provided with the dots 210 of the braille teaching material is formed by successively stacking an outer layer 1100 provided with the dots 210 in the form of holes, and an inner layer 1200 to which the magnetic parts 220 are fixed.

Herein, the magnetic parts 220 may be embedded in the inner layer 1200, or some or all of the magnetic parts 220 may be exposed to outside.

FIG. 8 shows an example in which the magnetic parts 220 are embedded in the inner layer 1200.

Figure 9:
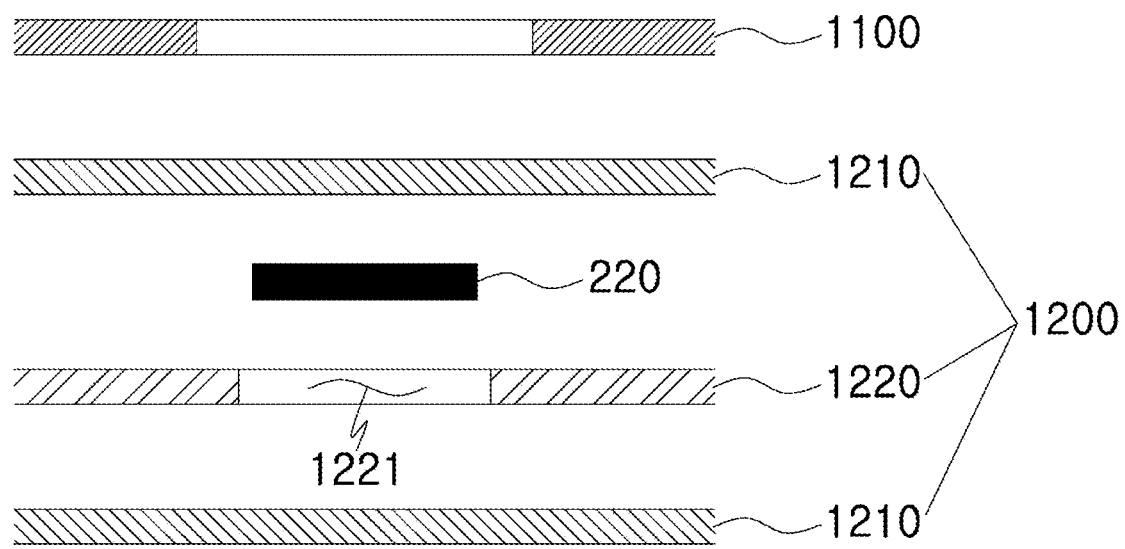
FIGS. 9 to 13 are diagrams illustrating separation and combination of cross sections taken along the cutting-plane line of FIG. 6 according to various embodiments.
Figure 9:
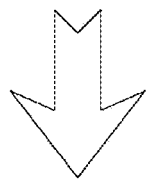
Figure 9:
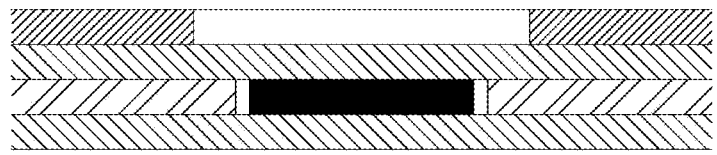
Figure 10:
Figure 10:
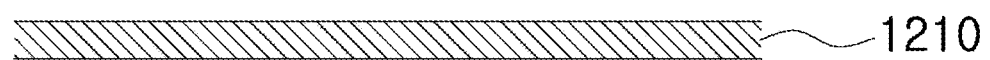
Figure 10:
Figure 10:
Figure 10:
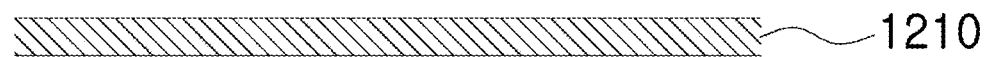
Figure 10:
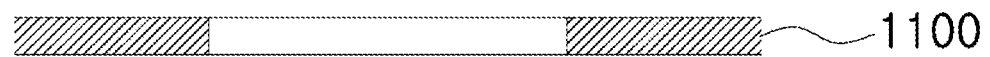
Figure 10:
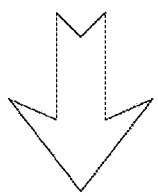
Figure 10:
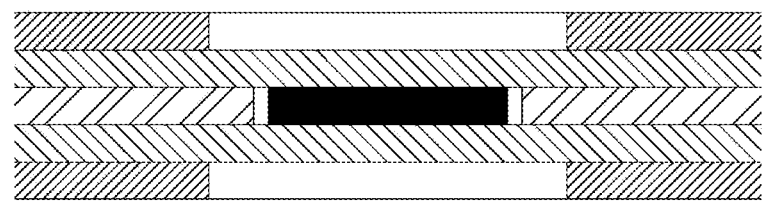

FIG. 9 shows an example in which the outer layer 1100 is attached to only one side of the inner layer 1200. FIG. 10 shows an example in which the outer layer 1100 is attached to each of the opposite sides of the inner layer 1200.

As shown in FIGS. 9 to 12, according to an embodiment of the present disclosure, the inner layer 1200 of the braille teaching material may include a magnetic part covering layer 1210 placed at the upper side, at the lower side, or at the upper side and the lower side of the magnetic part 220.

Figure 11:
Figure 11:
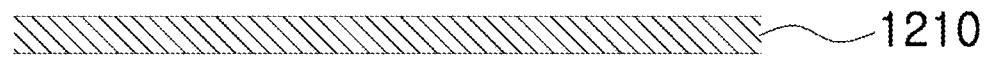
Figure 11:
Figure 11:
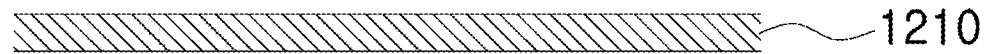
Figure 11:
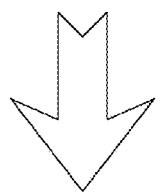
Figure 11:
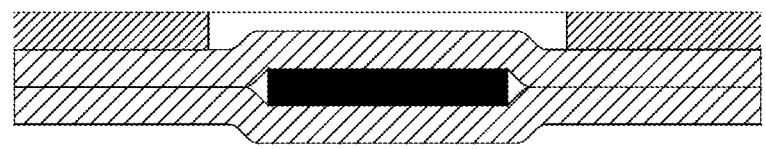

As shown in FIGS. 9 to 11, the magnetic part covering layer 1210 may be placed at the upper side and the lower side of the magnetic part 220. As shown in FIG. 12, the magnetic part covering layer 1210 may be placed at the upper or lower side of the magnetic part 220.

As shown in FIGS. 9, 10, 12, and 13, according to an embodiment of the present disclosure, the inner layer 1200 of the braille teaching material may include a magnetic-part-holding layer 1220 provided with a fitting hole 1221 into which the magnetic part 220 is interlocked.

The magnetic part 220 may be embodied in various ways. For example, as shown in FIGS. 9, 10, and 12, the magnetic part 220 may be interlocked into the magnetic-part-holding layer 1220. As shown in FIG. 13, the magnetic parts 220 may be bonded to each other at the opposite sides of the magnetic-part-holding layer 1220 using rivet bonding, or the like.

As shown in FIGS. 9, 10, and 12, the magnetic-part-holding layer 1220 may be used together with the magnetic part covering layer 1210. As shown in FIG. 13, the magnetic part covering layer 1210 may be not used.

As shown in FIG. 14, according to an embodiment of the present disclosure, the inner layer 1200 of the braille teaching material may be subjected to punch processing so that in a layer made of a magnet, a ferromagnetic substance, or a paramagnetic substance, the borders and the portions matched to the dots 210 corresponding to the raised dots of braille are left and the portions matched to the dots 210 corresponding to the unraised dots of braille are eliminated.

The punch processing is processing for acquiring a product by performing punch processing on the basic material, and refers to processing in which after a hole in the basic material is made using a punch, the remaining basic material is a product. The punch processing is the opposite concept of blank processing.

That is, the borders and the portions matched to the dots 210 corresponding to the raised dots of braille need to be left by punch processing, and the remaining portions matched to the dots 210 need to be connected to the borders.

In the case of representing the braille letter corresponding to the Korean letter "ㄷ", since the raised dots of braille corresponding to the Korean letter "ㄷ" are the dot 210 at the top right position and the dot 210 at the middle left position, punch processing is performed as shown in FIG. 14.

That is, it is preferable to partially perform punch processing around the portions matched to the dots 210 corresponding to the raised dots of braille in such a manner that the portions are connected to the borders. In addition, it is preferable to perform punch processing so that the portions matched to the dots 210 corresponding to the unraised dots of braille are area larger than the dots 210.

Although FIG. 14 shows an example in which frames are left so that the remaining portions matched to the dots 210 are connected to the border in a grid form, the present disclosure is not limited thereto. Various embodiments in which the remaining portions matched to the dots 210 are connected to the borders are possible.

In addition, although FIG. 14 shows an example in which punch processing is performed, the present disclosure is not limited thereto. Various embodiments are possible, for example, blank processing of the portion matched to the dots 210 corresponding to the raised dots of braille, and so on.

In addition, although FIG. 14 shows an example in which magnetic force is applied only to the dots 210 corresponding to the raised dots of braille, the present disclosure is not limited thereto. Magnetic force may be applied to all the dots of braille.

The applying of the magnetic force to all of the dots 210 of braille enables the teacher to teach the learner. This is to prevent the learning effect from decreasing, because magnetic force leads the visually impaired person to a correct answer even when the visually impaired person do not know the answer, which is a kind of cheating.

That is, an embodiment in which magnetic force is applied only to the dots 210 corresponding to the raised dots of braille is suitable for an embodiment that enables the visually impaired person to learn alone. An embodiment in which magnetic force is applied to all the dots 210 of braille is suitable for an embodiment that is used when the teacher helps the visually impaired person with learning.

According to an embodiment of the present disclosure, the sheet provided with the dots 210 of the braille teaching material is formed by stacking the outer layer 1100, the magnetic part 220, and a magnetism-shielding layer (not shown) in order.

The magnetism-shielding layer (not shown) is a layer in which a non-magnetic substance or a diamagnetic substance blocks one side of the magnetic part 220.

The magnetism-shielding layer (not shown) weakens the magnetic force that comes from the magnetic part 220 provided on one sheet and goes to another sheet, thereby preventing interference in learning caused by the magnetic part 220 provided on another sheet.

The magnetism-shielding layer (not shown) may be used in place of the inner layer 1200, or may be used together with the inner layer 1200.

As shown in FIG. 15, a method of manufacturing a braille teaching material according to an embodiment of the present disclosure includes an outer layer punching step S10, a magnetic part fixing step S20, a sheet manufacturing step S30, and a teaching tool manufacturing step (S40).

At the outer layer punching step S10, the dots 210 in the outer layer 1100 are punched.

At the outer layer punching step S10, the dots 210 in the outer layer 1100 are punched as shown in FIG. 7. When using Louis Braille's braille system, six dots 210 per braille letter are punched.

In the case where the information section and the braille section are provided on one page, the positions at which dots 210 are punched are provided on pages facing each other when the braille teaching material is closed, so that dots 210 on one page and dots 210 on another page correspond to each other.

For example, when dots 210 are formed at the lower left position on the left page when the braille teaching material is opened, dots 210 are formed on the lower right position on the right page.

Accordingly, in the case where the left page and the right page when the braille teaching material is opened are intended to be processed at one time, since the positions of the dots 210 on the left and the right page to be punched are the same when the left page and the right page are closed, the dots 210 on two pages are punched simultaneously by performing the punching operation once.

At the magnetic part fixing step S20, the position of the magnetic part 220 is fixed to the inner layer 1200.

The magnetic part fixing step S20 may be performed in various ways as in the embodiments described above with reference to FIGS. 7 to 14.

At the sheet manufacturing step S30, the outer layer 1100 and the inner layer 1200, or the outer layer 1100, the inner layer 1200, and the outer layer 1100 are stacked in order and bonded, so that a sheep provided with the dots 210 is manufactured.

The sheet manufacturing step S30 is performed as follows.

When one sheet in which one outer layer 1100 is provided on one page is manufactured, the sheet provided the dots 210 is manufactured by bonding the outer layer 1100 and the inner layer 1200, or by bonding the inner layer 1200 and the outer layer 1100 in that order.

When one sheet in which two outer layers 1100 are provided on respective pages is manufactured, the sheet provided with the dots 210 is manufactured by stacking the outer layer 1100, the inner layer 1200, and the outer layer 1100 in order and bonding the layers.

The present disclosure is not limited to the above-described embodiments and has a wide range of application. Various modifications are possible without departing from the substance of the present disclosure set forth in the accompanying claims.

At the teaching tool manufacturing step (S40), the teaching tool (300) detachably attached to the dot (210) due to attractive force caused by magnetic force to the magnetic part (220) is manufactured.

What is claimed is:

1. A braille teaching material comprising:
   an information section (100) showing learning information, not braille, to be used for learning, in a preset learning area;
   a braille section (200) showing dots (210) corresponding to vertical dots and horizontal dots of braille, in a preset braille area, and provided with a magnetic part (220) at some or all of positions where the dots (210) are arranged, the magnetic part (220) being made of a magnet, a ferromagnetic substance, or a paramagnetic substance; and
   a teaching tool (300) detachably attached to the dot (210) due to attractive force caused by magnetic force to the magnetic part (220).

2. The braille teaching material of claim 1, wherein the information section (100) shows the information provided in an uneven shape.

3. The braille teaching material of claim 2, wherein when the information to be used for learning is a letter, the information section (100) comprises a stroke part (110) indicating a direction in which each stroke of the letter is written.

4. The braille teaching material of claim 2, wherein when the information to be used for learning is a letter, the information section (100) comprises a start part (120) indicating a point at which each stroke of the letter starts.

5. The braille teaching material of claim 4, further comprising:
- a stroke order guidance section (400) in a preset area of opened pages of the braille teaching material, the stroke order guidance section (400) showing symbols that correspond to the start parts (120) and are arranged in the same order as the strokes of the letter are written.

6. The braille teaching material of claim 1, wherein the braille section (200) shows which dot (210) corresponds to a raised dot of braille, in a visual manner, in a tactile manner, or in a visual and tactile manner.

7. The braille teaching material of claim 1, wherein the braille section (200) comprises the magnetic part (220) that is made of the magnet, the ferromagnetic substance, or the paramagnetic substance, and provided at a position of the dot (210) corresponding to a raised dot of braille that represents the information shown in the information section (100).

8. The braille teaching material of claim 6, wherein in the braille section (200), coating printing with an epoxy material is performed at a position of the dot (210) corresponding to the raised dot of braille.

9. The braille teaching material of claim 1, further comprising:
- an NFC tag (not shown) provided in a preset tag area, and storing information required for voice guiding the learning information; and
- an NFC reader (not shown) outputting the learning information in a voice when recognizing the NFC tag.

10. The braille teaching material of claim 1, wherein a sheet provided with the dots (210) is formed by stacking, in order, an outer layer (1100) in which the dots (210) are formed in a hole shape, and an inner layer (1200) to which the magnetic part (220) is fixed.

11. The braille teaching material of claim 10, wherein the inner layer (1200) contains a magnetic part covering layer (1210) placed at an upper side, at a lower side, or at an upper side and a lower side of the magnetic part (220).

12. The braille teaching material of claim 10, wherein the inner layer (1200) contains a magnetic-part-holding layer (1220) that is provided with a fitting hole (1221) into which the magnetic part (220) is interlocked.

13. The braille teaching material of claim 10, wherein the inner layer (1200) is subjected to punch processing so that in a layer made of a magnet, a ferromagnetic substance, or a paramagnetic substance, borders of the layer and a portion of the layer which is matched to the dot (210) corresponding to a raised dot of braille are left and a portion of the layer which is matched to the dot (210) corresponding to an unraised dot of braille is eliminated.

14. A method of manufacturing the braille teaching material, the method comprising:
- punching, at an outer layer punching step (S10), the dots (210) in the outer layer (1100);
- fixing, at a magnetic part fixing step (S20), a position of the magnetic part (220) to the inner layer (1200);
- manufacturing, at a sheet manufacturing step (S30), the sheet provided with the dots (210) by stacking the outer layer (1100) and the inner layer (1200) or by stacking the outer layer (1100), the inner layer (1200), and the outer layer (1100) in order and bonding the layers; and
- manufacturing, at a teaching tool manufacturing step (S40), the teaching tool (300) detachably attached to the dot (210) due to attractive force caused by magnetic force to the magnetic part (220).

* * * * *